3,383,275
INSULATION UTILIZING BORON PHOSPHATE

Edward J. Croop and Charles H. Vondracek, Pittsburgh, Pa., assignors to Westinghouse Electric Corporation, East Pittsburgh, Pa., a corporation of Pennsylvania
No Drawing. Filed Apr. 12, 1963, Ser. No. 272,551
28 Claims. (Cl. 161—171)

This invention relates to electrical insulation and in particular concerns inorganic electrical insulation as well as electrical apparatus and equipment that includes the improved inorganic insulation associated therewith.

The inorganic insulation that is presently available commercially is not considered to be of general applicability in the electrical industry. For example, the oxides of lithium, sodium, and potassium, which are potentially useful for insulation purposes, evidence poor electrical properties especially at elevated temperatures and therefore are not widely used. Powdered, pre-formed boron phosphate requires very high temperatures for sintering to a unitary product. Glassy compositions have found use as bonding media and for the purpose of providing environmental protection. However, poor physical and electrical strength have been found in such compositions at higher temperatures, and accordingly, glass insulation has not been used on electrical equipment to an great extent.

It is, therefore, a primary object of the present invention to provide new electrical insulation that is inorganic and is easily formed, readily employed in conventional forms such as laminates, for potting purposes, for molding purposes and the like and yet can withstand high temperature and still evidence good physical and electrical properties.

It is a further object of this invention to provide a method for producing at relatively low temperatures coherent masses of inorganic insulating compositions that may be exposed to relatively high temperatures in use.

A more specific object of this invention is to provide inorganic insulation comprising boron phosphate, formed in situ as a coherent mass, coating or binder.

Briefly, the present invention accomplishes the above-cited objects by applying a mixture comprised of compounds which will yield boron phosphate in conventional forms of insulation such as laminates, potted and molded masses, coatings and the like, and forming the boron phosphate in situ.

Other objects and advantages of the invention will become apparent as the following description proceeds and features of novelty which characterize the invention will be pointed out in particularity in the claims annexed to and forming a part of this specification.

It has now been discovered that boron phosphate can be employed or applied as electrical insulation by first forming a mixture comprised of compounds that will yield boron phosphate and a tempering agent to make the mixture fluid or pasty if necessary, disposing the mixture at the site of its intended use and heating the mixture to remove volatiles and form the boron phosphate in situ. The mixture can be readily and conveniently applied as a coating on electrical conductors, or base sheets for laminates. The mixture may also be employed as a potting or molding compound to produce a coherent mass of insulation on or about electrical members or articles. Moreover, the boron phosphate alone may be employed as electrical insulation or it may act as a binder for other insulating materials. The insulation of this invention has a high insulation resistance, good dielectric strength and good flexural strength. The methods employed in applying this inorganic insulation approach the convenience characteristic of organic insulation and thus permit the use of boron phosphate in novel combinations with other insulating materials and in novel applications.

The application of boron phosphate as an inorganic high temperature electrical insulation in accordance with our discoveries is accomplished by providing a mixture comprised of compounds that will yield boron phosphate. This mixture, with modifications or additions thereto if desirable, is applied in its unreacted state and then heated to a relatively low temperature to produce or yield the inorganic insulation in situ. The advantages which attend these methods as opposed to the high-temperature sintering of a pre-formed compact will be apparent to those skilled in the art.

For example, a mixture of borate and phosphate salts, such as ammonium borate and ammonium phosphate or of boric acid and phosphoric acid may be used. These mixtures can be made in the form of a fluid, a creamy paste, a putty-like material, or other consistency largely dictated by the end use contemplated and the mode of application desired, that can thereafter be appropriately applied and shaped. The desired consistency may, in some instances, be inherent in the mixture of the salts, and in other instances the result of admixing the salts with volatile or decomposable carriers or tempering agents. Some mixtures of salts, or admixtures therewith, which are not sufficiently fluid at room temperature may be heated slightly to increase their fluidity when necessary. As will be apparent from the following description, the fugitive carriers or tempering agents permit the inorganic compositions to be applied in the same general manner that organic base insulating materials are applied.

By way of example, a mixture of diammonium phosphate and ammonium pentaborate admixed with sufficient water or an alcohol such as methanol or ethanol to form either a solution or paste may be applied as a coating to electrical conductors, base sheet material and like substrates, then heated to about 150° C. to evaporate the water or alcohol and yield an adherent coating or film at least part of which is boron phosphate. Molded shapes may be produced by simple techniques of heating the paste in a mold for one hour at about 150° C. Electrical coils and the like may be potted by coating them with the paste, as for example by dipping or brushing, and heating the coating for one hour at about 150° C. to yield an essentially solid layer of bonded insulation containing boron phosphate. The coatings or insulated articles may be subjected to a post treatment at temperatures above 150° C. to remove volatile products and drive the reaction to completion as outlined in detail hereinafter.

A mixture of mono-ammonium phosphate and ammonium biborate may be heated to about 200° C. to form a fluid mixture which may be applied directly without the necessity of a fugitive carrier or tempering agent. Similarly, a mixture of mono-ammonium phosphate and boric acid may be heated to become fluid and utilize without an added fugitive carrier. Of course, water or other fugitive tempering agents may be added to these mixtures if the particular application requires a more fluid mixture.

We have described the application of the boron phosphate forming compounds either as a mixture per se or with fugitive liquid carriers which will volatilize at the temperatures employed in processing. In addition, laminates, potting compositions, wire insulation and molded objects may be produced with fugitive solid carriers or temporary bonding materials including carbowax, gum arabic, polyester, epoxy and other organic resins and the like. Powdered octadecanol and other high molecular weight alcohols that are normally solid and contain 12 to 30 carbon atoms per molecule are especially suitable since they also act as lubricants and improve the flow of the mixtures of salts into and in the mold cavity. These solid fugitive carriers are used in amounts of about 1 to 20 weight percent, based on the weight of the boron phosphate producing salts or compounds, the solid carrier and any inert filler that may be added in accordance with principles discussed hereinafter.

In accordance with this invention, the mixture of compounds which will yield boron phosphate in situ include, for example, mixtures of at least one compound selected from the group of phosphoric acids and ammonium phosphates with at least one compound selected from the group of boric acids, boric oxide and ammonium borates. Examples of specific suitable compounds include the ortho, pyro, meta and hypo-phosphoric acids, mono and di-ammonium phosphates, hemi-basic ammonium phosphate, ammonium biborate, ammonium pentaborate and ammonium peroxyborate. Hydrated salt compounds, where they exist, may be employed. A mixture of any borate and phosphate which will yield boron phosphate and a product such as water, ammonia or other volatile material may be advantageously employed in the invention. It is to be understood that when an aliphatic alcohol, as for example, methanol, ethanol and the like, is employed as the fugitive tempering agent with boric acid and phosphoric acid, the resulting paste or solution will be a solution of methyl or ethyl phosphates and/or borates in the alcohol and the production of the boron phosphate may proceed from the reaction of the compounds in solution.

Mixtures comprised of about 30 to 40 weight percent of boric acid and 70 to 60 weight percent of phosphoric acid (85 percent concentration) can be used as well as mixtures of ammonium borate and ammonium phosphate to prepare the boron phosphate. Of course, phosphoric acid in other concentrations can be used as well with the corresponding adjustment to provide the reacting ratio indicated for the 85 percent material. The best results have been achieved with stoichiometric quantities of reactants. However, an excess of either reactant may be present, with excess borate being preferred in practice. These compositions, to which can be added any of the conventional inorganic fillers, e.g. talc, alumina, chopped glass fibers and the like in amounts up to about 85 percent based on the solids present in the resulting composition, have been used to pot coils by dipping and then drying the test coils. After a heat treatment at elevated temperatures serving essentially to cause reaction of the components to produce the boron phosphate and then cure it, strong hard insulating boron phosphate coatings have resulted. Reaction to produce the $BPO_4$ occurs readily and can go to completion at about 150° C., but we prefer to heat to about 400° to 600° C. or more for about 1 to 10 hours, for the additional heat treatment has been found to cause a surprising increase in strength and chemical and physical resistance of the resulting product. Wires have been similarly coated with the foregoing potting composition. In addition, laminates have been produced with these compositions by application of the boron phosphate producing mixture as a coating and impregnating material to function as a binder to fibrous material such as asbestos, glass papers, glass fiber cloth and the like. After assembling a suitable number of such coated sheets to provide the desired laminate thickness, the laminate is cured to produce the boron phosphate insulation. Such laminates also are particularly useful for applications where thermal insulation is needed.

Glass fiber tape coated or impregnated with a boron phosphate producing mixture, with or without a finely divided (or a fineness of about 20 mesh to a fraction of a micron) filler such as silica, alumina, and mica dust, and mixtures of two or more fillers, in amounts up to about 50 percent by weight. The mixture of compounds together with the filler on the glass cloth may be applied to a conductor by wrapping and then pressed under heat to provide inorganic insulation. Large thin mica flakes may be coated with boron phosphate producing mixture and pressed and cured into sheets and plates, with a glass cloth backing.

In such practices, a tempering fluid such as water, alcohol or other fugitive liquid carrier is added in an amount to provide a good working consistency. Generally, up to about 60 weight percent of such liquid is used, with the lower quantities being added for putty or creamy consistencies and the larger amounts for more fluid products applied, for example, to conductors by immersion. Use of the acids results in pastes, and liquids such as water can be added for the desired fluidity of the resulting slurry. The ammonium borate and phosphate salts from solutions of up to about 30 weight percent of available boron phosphate in water, as do the boric and phosphoric acids in alcohols such as methyl and ethyl alcohol. These physical differences in the mixtures provide a wide range of methods of utilizing the present invention.

The invention will be described further in conjunction with the following specific examples in which the details are given by way of illustration and not by way of limitation.

EXAMPLE I

Laminates were prepared using the present invention as follows: a composition of 37.5 parts of dry diammonium phosphate and 15.5 parts of ammonium pentaborate octahydrate dissolved in 47.0 parts of water was applied to thin layers of glass cloth. The coated cloth was air dried for 24 hours and cut into 4 x 4 inch squares and assembled to a 30-layer laminate. The laminate was pressed at 10 tons total pressure and 175° C. for one hour. Thereafter, the laminate was cured by heating to 500° C. over a 16-hour period. The average flexural strength at room temperature was then determined and found to be 7000 p.s.i.

EXAMPLE II

A potting composition according to the invention was made as follows: boric acid and phosphoric acid were combined using 35 parts by weight of boric acid and 65 parts by weight of phosphoric acid (85 percent concentration). To this mixture were added three parts by weight of alumina for each part of the mixture. Based on the solids present, 16 parts of water were added to provide fluidity and the resulting mixture was thoroughly stirred. Then a coil was coated by immersing it in the mixture. The test coil was then dried at 90° C. overnight. After drying, the coil was fired to 500° C. Visual examination of the coil showed it to have a strong, hard, solid coating. The insulation resistance to ground was determined and found to be $10^7$ ohms.

Other potting compositions were made using silicon carbide, zircon and chopped glass fibers as filler materials with equally satisfactory results.

EXAMPLE III

Two No. 18 AWG stainless steel clad copper wires were coated by immersing them in the potting composition of Example II. These wires were then dried at 90° C. The two strands of the dried, coated wires were then twisted together as in the AIEE No. 57 twist test procedure. The twisted wires were fired to 500° C. The insulation resistance was then determined at room temperature and found to be one megohm and the electrical breakdown was found to be 400 volts.

EXAMPLE IV

Laminates were prepared using the present invention as follows: a composition of 35 parts of dry boric acid and 65 parts of phosphoric acid (85 percent) was mixed for two hours until a smooth, creamy paste was obtained This was applied as a thin layer to an asbestos sheet. The coated asbestos was cut into 4 x 4 inch squares and assembled to a 40 layer laminate. The laminate was pressed at five tons total pressure and 150° C. for 30 minutes. Thereafter, the laminate was cured by heating to 500° C. over a 6-hour period. Electrical and physical properties were determined. The dielectric strength on the ¼-inch specimen was 8.5 kv., the insulation resistance was $2.76 \times 10^{10}$ ohm-cm., and the average flexural strength exceeded 30,000 p.s.i.

In other practices of preparing laminates, it was determined that good flexural strength consistently resulted when the coated base material was dried to remove about 30 to 60 percent of its moisture content before the laminate is pressed. This can be readily accomplished at a temperature of about 80° to 150° C. in 1 to 25 hours. Heating in air, suitably flowing air, is satisfactory for this purpose.

EXAMPLE V

A molding composition of the invention was prepared as follows: 35 parts of boric acid and 65 parts of the 85 percent phosphoric acid were mixed. To 80 grams of that mixture, 500 grams of minus 325 mesh alumina were added. The resulting mixture was mulled. Then an ethyl alcohol solution of octadecanol was added in an amount to provide 1.38 percent of the octadecanol in the resulting mixture. After mulling in the lubricant, the resulting mixture was placed in a die and cold pressed into a ½ x ½ x 5 inch test bar at 10 tons per square inch pressure. The test bar was fired to 500° C. and then cooled. The flexural strength of this test bar was found to be 1000 p.s.i.

From the foregoing discussion and description, it is evident that the present invention provides a unique advance in the art of inorganic insulation as well as electrical equipment that includes such insulation. In view of our discoveries, good elevated temperature, inorganic insulation comprising boron phosphate can now be prepared readily whereby its outstanding properties can be experienced without loss in the use of skills, techniques and the like presently used in this industry. The use of preformed boron phosphate, on the other hand, would require firing to a temperature on the order of 1100° C. to 1250° C. Many fillers and reinforcements would be severely damaged at those temperatures. Providing boron phosphate in the manner of the present invention permits the use of much lower temperatures as noted and results in a more uniform and intimate distribution of the boron phosphate. Moreover, the mixture of reactants permits molding or processing of the filler and partially dried materials very easily. This is particularly true where the reactants comprise ammonium borate and ammonium phosphate because of the fluid state of these materials when heated to temperatures on the order of about 150° C. In addition to the properties recited hereinbefore, the products of this invention are also good thermal insulators and can also be used where such insulation is desired.

It should be understood that the applied mixture of compounds which yield the boron phosphate in situ are all preferably heated above about 150° C. for a minimum of one hour. Although the reaction for some mixtures may be initiated at lower temperatures, including room temperature, the reaction will not go to completion at temperatures below 125° C. and at atmospheric pressures within a reasonable period of time. Reduced pressures will tend to drive the reaction to completion. At 90° C. and atmospheric pressures, for example, the most reactive mixture will not go to completion even after a week at that temperature. It is, of course, desirable for the reaction to go to completion to eliminate all water whether present as such or combined in the hydrated compounds and to eliminate other volatiles if present. Optimum properties are developed by heating all of the mixtures to about 400° to 600° C. or more for about 1 to 10 hours either for the initial reaction or as a post-treatment. Where the mixture is reacted in a confined space, as in a mold cavity for example, it is advantageous to subject the article to a post-treatment in an environment where the volatiles may escape more readily. The initial treatment, as for example 150° C. for 1 hour, is sufficient to bind the mass into a solid coherent article.

We have found that the combination of ammonium salts must be heated to higher temperatures, about 400° C. for example, to satisfactorily complete the reaction while a mixture of the acids will essentially completely react after a prolonged period at 150° C.

It should also be understood that the inorganic laminates produced in accordance with this invention exhibit especially unusual properties, as for example, the flexural strength and the ability to be punched, drilled, sawed, sheared and the like.

All percentages and parts given hereinbefore are by weight unless otherwise indicated or apparent.

While the invention has been described with respect to specific materials, applications and the like, it will be appreciated that variations, substitutions and changes can be made without departing from its scope.

We claim:

1. A method of insulating an electrical conductor comprising forming a mixture of (A) at least one compound selected from the group consisting of boric acid and borate salts and (B) at least one compound selected from the group consisting of phosphoric acid and phosphate salts that upon heating to an elevated temperature react to form boron phosphate, tempering the mixture with a fugitive liquid and mixing it to a fluid consistency, disposing the mixture on the conductor, drying the coated conductor and heating it at a temperature above about 150° C. to convert the mixture to a hard, strong mass of boron phosphate.

2. A method in accordance with claim 1 in which the mixture comprises 30 to 40 parts by weight of boric acid and 60 to 70 parts by weight of 85 percent phosphoric acid.

3. A method of producing a member suitable for forming a laminate comprising providing a sheet of inorganic non-conducting base material, forming a mixture of (A) at least one compound selected from the group consisting of boric acid and borate salts and (B) at least one compound selected from the group consisting of phosphoric acid and phosphate salts that upon reaction produce boron phosphate, tempering the mixture to a workable consistency, applying a layer of the mixture to a surface of the base material, then heating the coated base material to a temperature above about 150° C. to convert the mixture to boron phosphate and heat cure it to a chemically inert state.

4. A method in accordance with claim 3 in which the base material is an asbestos sheet, the mixture comprises 30 to 40 parts by weight of boric acid and 60 to 70 parts by weight of 85 percent phosphoric acid, and sufficient water is added thereto to form a creamy paste consistency.

5. A method in accordance with claim 3 in which said mixture comprises substantially stoichiometric proportions of ammonium phosphate and ammonium borate and the coated base material is heated to a temperature of at least about 400° to 600° C. to convert the salts to boron phosphate and cure the coating composition.

6. A method in accordance with claim 3, the coated base material being dried sufficiently to remove a substantial portion of volatiles before being cured.

7. A method in accordance with claim 3 in which the coated base material is heated to a temperature of at least about 400° to 600° C. to cure the coating material.

8. A method for producing a solid coherent mass of insulation containing boron phosphate generated in situ comprising the steps of admixing and disposing at the site (A) at least one compound selected from the group consisting of phosphoric acids and phosphate salts with (B) at least one compound selected from the group consisting of boric acids and borate salts and heating the admixture to at least about 150° C.

9. The method of claim 8 wherein a fugitive carrier is included in the admixture of (A) and (B).

10. The method of claim 9 wherein the fugitive carrier is a volatile liquid.

11. The method of claim 10 wherein the volatile liquid is water.

12. The method of claim 8 wherein an inorganic filler is included in the admixture of (A) and (B).

13. The method of claim 12 wherein the inorganic filler is selected from the group consisting of finely divided talc, alumina, silica, and mica.

14. The method of claim 12 wherein the inorganic filler is selected from the group of fibrous materials consisting of glass and asbestos.

15. The method of claim 14 wherein the fibrous material is in sheet form.

16. The method of claim 8 wherein phosphoric acid, boric acid and water are admixed and the admixture is heated to at least about 150° C. to drive off volatiles and form boron phosphate.

17. The method of claim 16 wherein an inorganic filler is included in the admixture.

18. The method of claim 8 wherein an ammonium phosphate, an ammonium borate and water are admixed and the admixture is heated to at least about 400° C. to drive off volatiles and form boron phosphate.

19. The method of claim 18 wherein an inorganic filler is included in the admixture.

20. A method of preparing an article of insulation comprising the steps of admixing (A) at least one compound selected from the group consisting of boric acid and borate salts, (B) at least one compound selected from the group consisting of phosphoric acid and phosphate salts and (C) a fugitive tempering agent, impregnating an inorganic reinforcing sheet material with said admixture and thereafter heating to a temperature above about 150° C.

21. The method of claim 20 wherein said fugitive tempering agent is water, said reinforcing sheet material comprises finely divided mica and the heating is conducted at a temperature above about 400° C.

22. The method of claim 20 wherein the compound (A) is an ammonium borate and the compound (B) is an ammonium phosphate.

23. The method of claim 21 wherein the heating is conducted at a temperature of about 600° C.

24. The method of claim 22 wherein said inorganic base sheet material is a sheet of an inorganic material selected from the group consisting of asbestos, mica and glass fibers.

25. A method of preparing an inorganic laminate suitable for use at high temperatures comprising the steps of providing an inorganic base sheet material, impregnating the base sheet with a solution containing ammonium borate and ammonium phosphate salts, removing the solvent from the impregnated sheet, superimposing plural plies of the impregnated sheet, pressing the plies together and heating to at least about 150° C. to produce a unitary structure and then heat treating the unitary structure at a temperature of at least about 400° to 600° C.

26. The method of claim 25 wherein said inorganic material is mica.

27. A laminate comprising plural plies of an inorganic base sheet material, the plies being impregnated with and bound together into a unitary mass by boron phosphate.

28. The laminate of claim 27 wherein the base sheet material is a sheet of an inorganic material selected from the group consisting of asbestos, mica and glass fibers.

References Cited

UNITED STATES PATENTS

| 3,009,230 | 11/1961 | Gruber. |
| 3,090,703 | 5/1963 | Gruber _____ 117—106 |

FOREIGN PATENTS

| 457,729 | 3/1928 | Germany. |

OTHER REFERENCES

German printed application, 1,093,648, November 1960.

WILLIAM L. JARVIS, *Primary Examiner.*